April 12, 1927. 1,624,665
K. S. JOHNSON ET AL
WAVE FILTER
Filed Jan. 31, 1925   4 Sheets-Sheet 1

Inventors:
Kenneth S. Johnson
Timothy E. Shea
by   E.W. Adams   Att'y.

April 12, 1927. 1,624,665

K. S. JOHNSON ET AL
WAVE FILTER
Filed Jan. 31, 1925   4 Sheets-Sheet 2

Inventors:
Kenneth S. Johnson
Timothy E. Shea
by E. W. Adams  Att'y

April 12, 1927. 1,624,665
K. S. JOHNSON ET AL
WAVE FILTER
Filed Jan. 31, 1925 4 Sheets-Sheet 3

Inventors:
Kenneth S. Johnson
Timothy E. Shea
by E.W. Adams, Atty.

April 12, 1927.

K. S. JOHNSON ET AL 1,624,665

WAVE FILTER

Filed Jan. 31, 1925    4 Sheets-Sheet 4

Inventors:
Kenneth S. Johnson
Timothy E. Shea
by E. W. Adams Att'y.

Patented Apr. 12, 1927.

1,624,665

UNITED STATES PATENT OFFICE.

KENNETH S. JOHNSON, OF JERSEY CITY, AND TIMOTHY E. SHEA, OF RUTHERFORD, NEW JERSEY, ASSIGNORS, BY MESNE ASSIGNMENTS, TO WESTERN ELECTRIC COMPANY, INCORPORATED, A CORPORATION OF NEW YORK.

WAVE FILTER.

Application filed January 31, 1925. Serial No. 5,959.

This invention relates to electric wave filters, and more particularly to broad band wave filters having inductively coupled impedance elements.

An object of the invention is to employ the mutual inductance of coupled impedance elements in a wave filter network in the production of a desired transmission characteristic.

The common procedure heretofore in the design and construction of broad band wave filters has been to compute the design on the assumption that each element has no impedance coupling with any other element, and, in the physical embodiment of the filter, to employ such mechanical forms and arrangements as would insure that the assumption is substantially justified.

By the use of toroidally wound inductance coils and shielded condensers, it has been possible to eliminate almost completely any mutual impedance of the elements, but it has been found that under certain conditions toroidal inductances are relatively wasteful of copper and that a considerable economy may be secured by the use of simple solenoids. Such coils, however, have pronounced external fields and mutual inductance between them is difficult to avoid except by large separations or by disposing their axes in mutually perpendicular directions.

By the use of filter sections constructed in accordance with the present invention, it is possible to combine some of the inductance coils in pairs, the mutual inductance being usefully employed to determine the transmission characteristic, with the result that the problem of disposing the inductance coils in non-interfering relationship is greatly simplified.

Another object of the invention is, therefore, to facilitate the use in wave filter construction of the types of inductance that possess the greatest copper economy.

A feature of the wave filters embodying the invention is that the mutual inductance between elements in two branches of the network is equivalent in effect to a negative inductance inserted in a third branch. The filters, therefore, by virtue of this feature exhibit characteristics that cannot be obtained with the use of positive inductances only.

A further object of the invention is therefore to provide wave filters having novel transmission characteristics which are secured by the use of negative inductances as impedance elements.

The nature of the invention and the method of practicing it will be more clearly understood from the detailed description which follows when read in connection with the accompanying drawings, of which—

The theory of wave filters has been most extensively developed in connection with schematic structures of the so-called ladder type, these being line networks comprising series impedances and shunt impedances arranged in a tandem sequence. It is convenient, therefore, for the purpose of explaining the characteristic properties of the filter sections embodying the invention, first of all to reduce the mutually coupled systems to the simple ladder type networks to which they are equivalent. The properties of the equivalent ladder type structures may then be determined by the application of the principles and formulæ disclosed in the following publications: Physical Theory of the Electric Wave Filter—G. A. Campbell, The Bell System Technical Journal, Vol. I, No. 2, November 1922; Theory and Design of Uniform and Composite Electric Wave Filters—O. J. Zobel, The Bell System Technical Journal, Vol. II, No. 1, January, 1923; and U. S. Patent No. 1,227,113 to G. A. Campbell, issued May 22, 1917.

Figure 1:
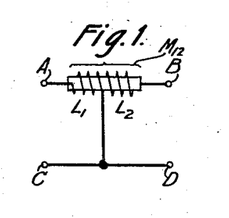
Figs. 1, 2 and 3 illustrate certain basic relationships made use of in explaining the invention.

Fig. 1 represents a four-terminal network comprising two self-inductances $L_1$ and $L_2$ connected together and having mutual inductance $M_{12}$, the network being adapted for wave transmission between terminals A. C. and terminals B. D. This network is simply a transformer having its two windings joined together at the common terminal C. D., but it has the special property that the windings are so arranged that the mutual inductance adds to the total inductance as measured between terminals A and B. That is, with respect to the end terminals A and B, the windings are connected series-aiding.

Figure 2:
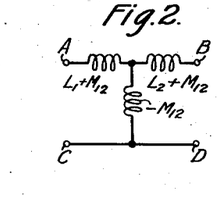
Figure 3:
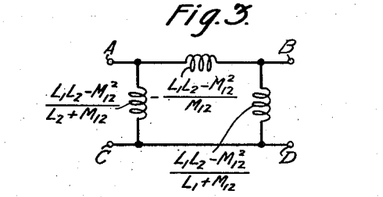

In accordance with well known principles relating to transformers, the network of Fig. 1 may be shown to be equivalent to the T network of Fig. 2 or to the Π network of Fig. 3. In Fig. 2 the transformer is replaced by two series inductances, $L_1+M_{12}$, and $L_2+M_{12}$, and a shunt negative inductance, $-M_{12}$; and in Fig. 3 it is replaced by two shunt inductances, both positive, and a single series negative inductance, $-L_n$, having the value $$-L_n = -\frac{L_1 L_2 - M_{12}^2}{M_{12}} \quad (1)$$

It is to be noted that in each of the equivalent networks of Figs. 2 and 3, one branch comprises a negative inductance, the sign of which results from the series-aiding sense of the windings in Fig. 1. The mutual inductance of two series-aiding windings is generally referred to as a positive mutual inductance and will be so designated in this specification.

Figure 4:
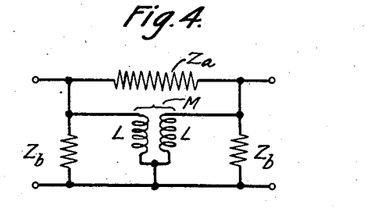
Figs. 4 and 4ª show in different schematic forms one general type of filter section embodying the invention.
Figure 4A:
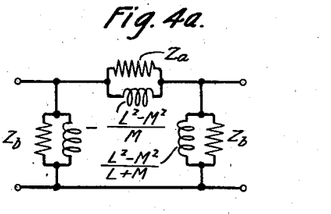
Figure 5:
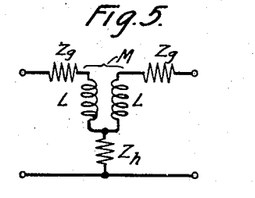
Figs. 5 and 5ª show in like manner another general type of filter section embodying the invention.

The most general types of filter section in accordance with the present invention are represented in schematic form by Figs. 4 and 5 and in respectively equivalent form by Figs. 4ª and 5ª. These filter sections are of symmetrical structure with respect to waves propagated in either longitudinal direction, corresponding to the horizontal direction in the figure.

In Fig. 4 the coupled inductances are associated with a Π network comprising a series impedance $Z_a$ and two equal shunt impedances $Z_b$. The two inductances are equal, of magnitude L, and have mutual inductance M. The impedances $Z_a$ and $Z_b$ may comprise any combinations of non-dissipative reactive elements, restricted only by certain relationships, which will be discussed generally in another part of the specification, when it is desired that the filter shall transmit only a single band of frequencies.

The filter section is essentially shunt terminated. If joined in a sequence with other similar sections, it constitutes a recurrent ladder type structure of which the series branches have the same impedance as the series branch of the individual section shown in the figures, and the shunt branch impedances have half the shunt branch impedance of the single section. On account of the mutual inductance between the shunt inductances, symmetrical sections of the recurrent structure cannot be isolated except by division through the middle of a shunt impedance or as it is briefly termed, at mid-shunt.

Figure 5A:
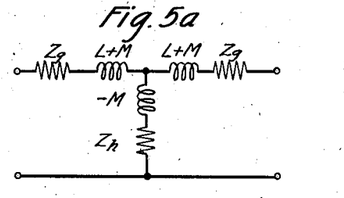

In Fig. 5 the coupled inductances are associated with a T network of impedances comprising equal series impedances $Z_g$ and a shunt impedance $Z_h$, the simple equivalent network being shown in Fig. 5ª. The type of section illustrated in these figures is essentially mid-series terminated and cannot be separately constructed with a shunt termination.

The limitations to which the generalized impedances $Z_a$ and $Z_b$ of Fig. 4 and $Z_g$ and $Z_h$ of Fig. 5 are subject in order that only one pass-band may exist may be understood most readily by comparing the frequency characteristics of the full series and full shunt impedances. It is to be assumed that both impedances comprise only reactive elements, substantially free from resistance; in an ideal wave filter resistance would be entirely absent and in practical wave filters the ideal characteristics are approximated more closely as the resistance of the elements is reduced.

It has been pointed out in the references cited above, that in a recurrent wave filter structure the range and the limits of the pass-bands are defined by the equation $$0 \geq \frac{Z_1}{4Z_2} \geq -1 \quad (2)$$

in which $Z_1$ and $Z_2$ are respectively the series and the shunt impedances of the recurrent structure, or, the full series and the full shunt impedances of the filter sections.

It is evident that band limits will exist at those frequencies for which $Z_1$ is zero, provided $Z_2$ is not zero also, or, in other words, at the resonance frequencies of the series branches, provided the shunt branches are not simultaneously resonant. Band limits will also occur when $Z_2$ is infinite, that is when the shunt branches are anti-resonant, provided that the series branches are not anti-resonant at the same frequencies. In addition, band limits occur when $$Z_1 = -4Z_2 \quad (3)$$

or, when the series branch impedance is four times that of the shunt branch and of opposite sign.

Figure 6:
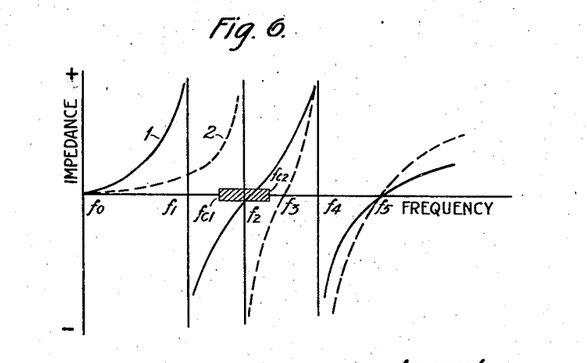
Fig. 6 illustrates certain principles relating to wave filters in general.

Typical impedance frequency characteristics are illustrated in Fig. 6 for impedances in which the inductances and capacities are all positive. Two characteristics are shown corresponding to the series and the shunt impedances of a single pass-band wave filter, the continuous curve 1 representing the series branch impedance, and the dotted curve 2 representing the shunt branch impedance multiplied by four. The characteristic features of the two curves are the uniformly positive slope throughout and the succession of alternate resonant and anti-resonant frequencies. These features are discussed in detail in the articles by Campbell and Zobel mentioned above.

Various combinations of reactive elements could be devised to have the impedance characteristics shown in the figure; the simplest combinations, however, in the particular case illustrated are the same for both impedances, namely two simple anti-resonant circuits and a simple inductance all connected in series. The anti-resonance frequencies of the series impedance $Z_1$ are indicated by $f_1$ and $f_4$, and the corresponding frequencies of the shunt impedance are indicated by $f_2$ and $f_4$.

By causing the anti-resonance frequency $f_2$ of the shunt impedance to coincide with a resonance frequency of the series impedance, two possible independent band limits are brought together; by causing the remaining resonance frequencies $f_0$ and $f_5$ of the series impedance to coincide with resonance frequencies of the shunt arm, and, further, by causing the anti-resonance frequency $f_4$ of the shunt impedance to coincide with an anti-resonance frequency of the series impedance the formation of other pass-bands is prevented.

The sole transmission band extends on both sides of $f_2$ to the limits $f_{c1}$ and $f_{c2}$ at which the ordinates of the two curves are equal but of opposite sign.

The conditions relating to the procuring of a single pass-band may be stated as follows:

If both impedances have the same resonance and anti-resonance frequencies, zero and infinite frequencies being included, there will be no pass-bands; if the series branch have one independent resonance frequency, a single pass-band will result; if the shunt branch have one independent anti-resonance frequency, a single pass-band will result; and if the independent resonance frequency of the series branch is coincident with the independent anti-resonance frequency of the shunt branch, a single band will result from the confluence of the two bands established by each independent frequency separately.

From the foregoing, it is evident that wave filter structures in great numbers and of great complexity may be devised to pass a single band of frequencies and also that structures of practically unlimited variety may be constructed having several pass-bands.

For most purposes, however, it is not necessary or desirable to consider structures in which there are more than eight elements in the series and shunt branches together.

In the wave filter sections of the present invention, there is present a novel feature in that one branch, either the series or the shunt, effectively includes a negative inductance, and in consequence does not exhibit the property of a uniformly positive slope in its impedance characteristic.

The negative inductance is present only by virtue of the inductive coupling of two inductance coils, but, since the theory of wave filters, as it has been developed and disclosed, is applicable most directly to structures of the series-shunt impedance type, the properties of wave filters embodying the invention will be developed in terms of the general equivalent structures of Figs. 4$^a$ and 5$^a$, in which the negative inductance appears as a discrete element. The actual physical embodiment of the structures will be appreciated from the more familiar schematic representations of Figs. 4 and 5.

Figure 7:
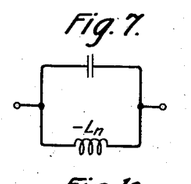
Figs. 7 to 12, inclusive, show in schematic form various impedance networks employed in the invention.
Figure 8:
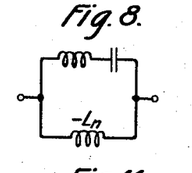
Figure 9:
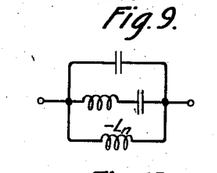
Figure 10:
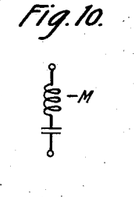
Figure 11:
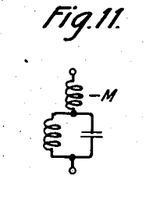
Figure 12:
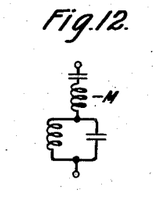

The simpler combinations that may constitute the series impedance of the filter section of Fig. 4$^a$ are shown in Figs. 7, 8 and 9, while combinations that may constitute the shunt branch of Fig. 5$^a$ are shown in Figs. 10, 11 and 12. The elements corresponding to the negative inductance in Fig. 4$^a$ are designated $-L_n$ in Figs. 7, 8 and 9, the value of which is given in terms of the constants of the coupled coils by equation 1. The negative inductance elements corresponding to the negative inductance of Fig. 5$^a$ are designated $-M$ in Figs. 10, 11 and 12.

Figure 13:
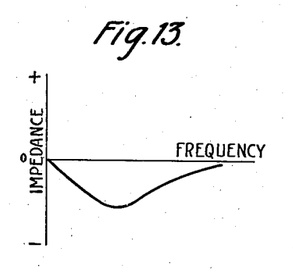
Figs. 13 to 18, inclusive, show the impedance characteristics of the networks of Figs. 7 to 12.
Figure 14:
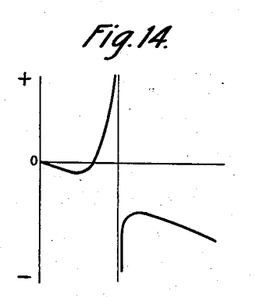
Figure 15:
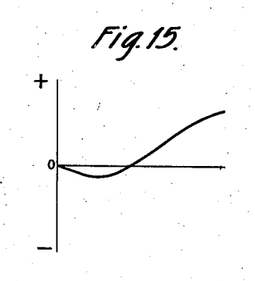
Figure 16:
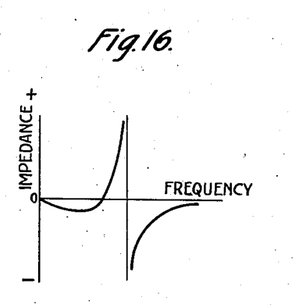
Figure 17:
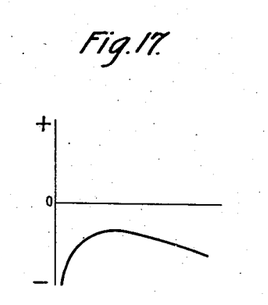
Figure 18:
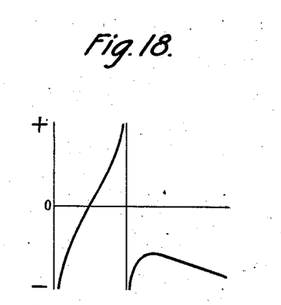
Figure 19:
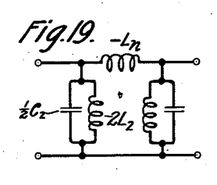
Figs. 19 to 27, inclusive, show in schematic form particular examples of wave filter sections corresponding to Figs. 4 and 5.
Figure 20:
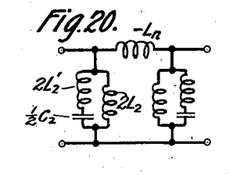

The impedance-frequency characteristics of these combinations are illustrated in Figs. 13 to 18, inclusive. Fig. 13 represents the impedance of the combination shown in Fig. 7; Fig. 14 corresponds to Figs. 8 and 11; Fig. 15 corresponds also to Fig. 8 for a particular relationship among the elements; Fig. 16 shows the impedance of the combination in Fig. 9 and Figs. 17 and 18 correspond to Figs. 10 and 12, respectively.

The combination of Fig. 7 differs from the ordinary anti-resonant combination in that its impedance reaches a negative maximum instead of becoming infinite when the reactances of the two elements are numerically equal. Under the same circumstances the impedance of the simple series combination of Fig. 10 reaches a minimum value instead of becoming zero as it would were the inductance positive.

The combination of Fig. 8 may be anti-resonant at some frequency above the resonance frequency of the simple resonant combination in parallel with the negative inductance, the condition at anti-resonance being that the positive reactance of the resonant branch is numerically equal to the reactance of the negative inductance. If, however, the inductance in this branch is less than the negative inductance, such anti-resonance cannot occur at any finite frequency. Fig. 15 corresponds to this particular case.

Figure 25:
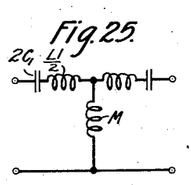
Figure 26:
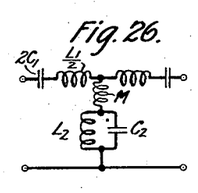
Figure 27:
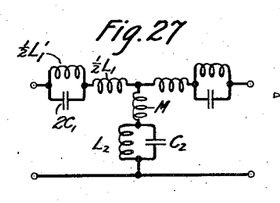

Various band-pass filter sections in which the impedance combinations of Figs. 7 to 12 are employed are shown in Figs. 19 to 27, inclusive. The sections shown in Figs. 19 to 24, inclusive, are of the mid-shunt type corresponding to Fig. 4, and those of Figs. 25, 26 and 27 are of the mid-series type corresponding to Fig. 5. In the mid-shunt types, the series branch negative inductances are denoted by $-L_n$ and in the mid-series types the shunt branch negative inductance is denoted by $-M$. In both types the series inductances and capacities are indicated by the subscripts 1 and the shunt coefficients by the subscripts 2, similar quantities occurring in the same branch being differentiated by prime marks. Factors 2 and ½ are used in connection with the terminal coefficients to take account of the mid-section terminations.

It is possible to develop explicit formulæ for the inductance and capacity coefficients in terms of the critical frequencies and the impedance of the filter, but such formulæ in many cases prove to be complicated in form and cumbersome in use, for which reason a preferred method of design will be described, which is applicable not only to wave filters of the present invention but to any type of wave filter.

The preferred method of design makes use of the knowledge of the form of the frequency characteristics of the series and shunt impedances to determine the principal features of the filter transmission characteristic, and employs the relationship expressed by equation 2 to fix the limits of the transmission band. In general the procedure is the same as would be observed in the development of explicit formulæ for the inductances and capacities but the complete mathematical solutions are omitted.

The method will be illustrated in connection with the design of a filter section of the type shown in Fig. 23.

Figure 28:
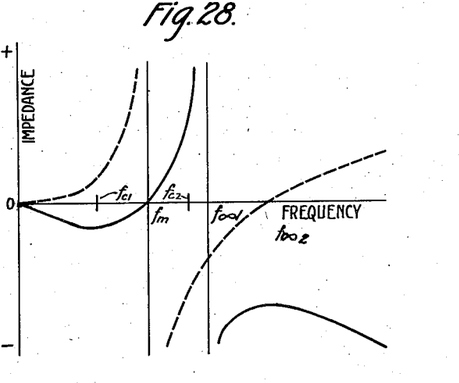
Figs. 28, 29 and 30 illustrate various characteristics of the filter section shown in Fig. 23.

The impedance-frequency characteristics of the series and shunt impedances are shown in Fig. 28, the continuous line representing the impedance of the series branch and the dotted line representing four times the impedance of the full shunt branch. The reactive components only are shown, it being assumed that the elements have negligible resistance. The ordinates are proportional to impedance and the abscissæ to frequency, but aside from this the curves are correct merely as to form and are not intended to represent any particular numerical example.

The conditions, discussed in an earlier paragraph relating to the maintenance of a single transmission band, require that the resonance frequency of the series branch and the anti-resonance frequency of the shunt branch be coincident. In the figure, this common frequency is denoted by $f_m$. The band extends on both sides of $f_m$ to limiting frequencies $f_{c1}$ and $f_{c2}$ at which the ordinates of the two curves are of equal length and of opposite sign.

The frequency designated $f\infty_1$ at which the series branch is anti-resonant, and the frequency $f\infty_2$ at which the shunt branch is resonant, are frequencies at which the wave attenuation in the filter is infinitely great and are therefore important frequencies in connection with the filter design.

It should be noted that the two impedances have opposite sign at frequencies above $f\infty_2$. It might appear that an additional transmission band could occur at some higher range, but this is impossible on account of certain limitations that are inherent in the relative values of the effective series and shunt impedances.

These limitations will be made evident by the following analysis:—

If in the general type of mid-shunt section shown in Fig. 4ª the impedances $Z_a$ and $Z_b$ are assumed to be infinitely great, a structure will result for which the full series branch impedance is that due to the negative inductance $$-\frac{L^2-M^2}{M}$$

and for which the full shunt impedance is that of the positive inductance $$\frac{1}{2}\frac{L^2-M^2}{L+M}$$

For such a structure, the ratio $$\frac{Z_1}{4Z_2}$$

which by equations 2 and 3 defines the transmission band limits, has the value $$\frac{Z_1}{4Z_2}=-\frac{L+M}{2M} \quad (4)$$

Since in a pair of equal coupled inductances the mutual inductance cannot exceed the self-inductance of each coil, this ratio cannot be less than unity, and can be equal to unity only with perfect coupling. In other words, unless the system corresponds to a perfectly coupled ideal transformer, there will be no transmission band.

If $Z_a$ is a large positive inductance, the effect will be to reduce the admittance of the series branch, or to increase its negative inductance. A positive inductance just equal in magnitude to the negative inductance would make the resultant inductance infinite and smaller values of the positive inductance would make the resultant inductance positive.

The presence of additional inductances in parallel with the negative inductance in the series arm tends, therefore, to make the ratio $$\frac{Z_1}{4Z_2}$$

greater than unity or positive, that is, to prevent the formation of a transmission band.

Similarly, additional inductance included in the shunt impedance $Z_b$ tends to reduce the resultant shunt impedance and hence again to increase the ratio $$\frac{Z_1}{4Z_2}.$$

Figure 23:
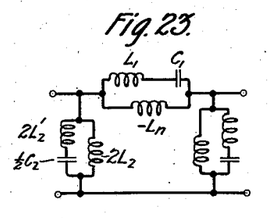
Figure 24:
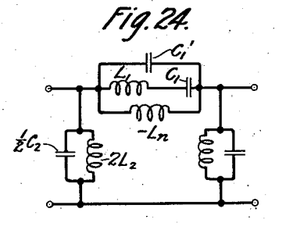

At very high frequencies, the series branch impedance of the filter in Fig. 23 is substantially that of $-L_n$ in parallel with $L_1$ and the shunt branch impedance is that of $L_2$ in parallel with $L_2'$; no transmission band can therefore occur.

At very low frequencies, the series and shunt impedances are substantially those of the coupled inductances and if the coupling is perfect the lower band limit may extend substantially to zero frequency. With any other degree of coupling, the band limit will be at some finite frequency.

Figure 30:
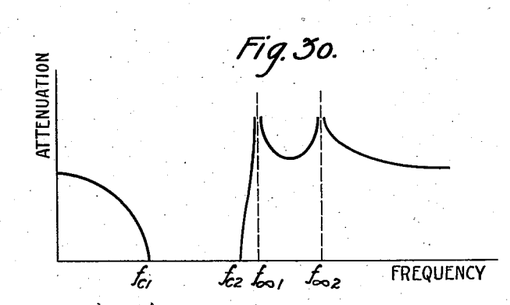

The type of attenuation characteristic obtained with this particular filter section is shown in Fig. 30 in which the natural logarithm of the ratio of input to output current in a single section, properly terminated, is plotted against frequency. By proper termination is meant that the terminating impedances are such as to cause no reflection loss at all frequencies, a condition not completely realizable in practice but which may be conceived to exist if the section is assumed to be one of an infinite series constituting a line.

A unique feature of the attenuation characteristic is the presence of two peaks on the one side of the band, at which the attenuation becomes infinite. This result arises from the use of negative inductance in one branch of the section whereby two resonance frequencies, namely zero and $f_m$, follow each other, and two anti-reasonance frequencies, namely $f\infty_1$ and infinity, follow each other.

The general characteristics of the series and shunt impedances having been examined, the most important problem of the design is to determine the values of the impedance elements corresponding to pre-assigned band limits, or, in other words, to determine the values that will place the transmission band in its proper frequency range. The frequencies of infinite attenuation $f\infty_1$ and $f\infty_2$ will usually be fixed by general considerations, both, however, being above the transmission band. A great freedom of choice may be used in assigning these frequencies and various advantageous characteristics may be secured thereby.

The frequency $f_m$ which, as has already been shown, is the frequency of the confluence of two transmission bands, may be chosen at some arbitrary value near the mean frequency of the desired transmission range, for a first approximation to the design.

A first approximate design may then be worked out in terms of the three assigned frequencies $f_m$, $f_1$, and $f_2$, all of which are determined by the resonance and antiresonance conditions of the two branches.

Let the trial value of the frequency $f_m$ be denoted by $f_{m \cdot o}$, then the following equations may be written down from the resonance conditions:

$$\left. \begin{aligned} f^2_{m.o} &= \frac{1}{4\Pi^2 L_1 C} \\ f^2_{m.o} &= \frac{1}{4\Pi^2 (L_2+L'_2)C_2} \\ f^2_{\infty 1} &= \frac{1}{4\Pi^2 (L_1-L_n)C_1} \\ f^2_{\infty 2} &= \frac{1}{4\Pi^2 L'_2 C_2}. \end{aligned} \right\} \quad (5)$$

These four equations are insufficient to determine six coefficients of inductance and capacity, but an additional equation may be formed in which the value of the iterative impedance of the filter is defined at one of the chosen frequencies, preferably $f_{m \cdot o}$, and from the five equations five of the coefficients may be computed in terms of the sixth.

The iterative impedance of a four terminal network such as a filter section has been defined as the impedance looking into a line comprising an infinite number of the networks connected in tandem. In the case of symmetrical filter sections the important iterative impedances are those of the mid-shunt and mid-series sections. Although the definition has been made in terms of an infinite line, the iterative impedance is a property of the network as it depends only upon the coefficients of the component impedance elements and, indeed, may be determined from measurements made upon the network by itself.

General formulæ relating to the iterative impedances of symmetrical filter sections are given in the two references hereinbefore mentioned. In terms of the series and shunt impedances, the mid shunt iterative impedance, denoted by $K_2$ is given by the equation $$K_2 = \frac{\sqrt{Z_1 Z_2}}{\sqrt{1 + \frac{1}{4}\frac{Z_1}{Z_2}}} \quad (6)$$

At the frequency $f_{m\cdot o}$ the series impedance $Z_1$ is zero and the shunt impedance $Z_2$ is infinite so that the value of the iterative impedance as given by equation 6 is indeterminate. The value may be determined, however, by substituting in equation 6 the values of $Z_1$ and $Z_2$ in terms of the reactances of the individual elements and finding the limiting value as the frequency approaches $f_{m\cdot o}$. This procedure leads to the value $$K_{2\cdot o} = \sqrt{\frac{L_2}{C_1} \times \frac{L_2}{L_2 + L'_2}} \quad (7)$$

$K_{2\cdot o}$ being the value of the mid-shunt iterative impedance at the frequency $f_{m\cdot o}$.

From equations 5 and 7 the following formulæ may be derived by simple mathematical processes, giving the coefficients $L_1$, $C_1$, $L_n$, $L'_2$, and $C_2$ in terms of $K_{2\cdot o}$ and $L_2$ $$\left.\begin{array}{l} L'_2 = L_2 \dfrac{f^2_{m.o}}{f^2_{\infty 2} - f^2_{m.o}}, \\[4pt] C_2 = \dfrac{1}{4\pi^2 L_2} \times \dfrac{f^2_{\infty 2} - f^2_{m.o}}{f^2_{\infty 2} f^2_{m.o}}, \\[4pt] C_1 = \dfrac{L_2}{K^2_{2o}} \times \dfrac{f^2_2 - f^2_{m.o}}{f^2_{\infty 2}}, \\[4pt] L_1 = \dfrac{K^2_{2.o}}{4\pi^2 L_2} \times \dfrac{f^2_{\infty 2}}{f^2_{m.o}} \times \dfrac{1}{f^2_{\infty 2} - f^2_{m.o}} \\[4pt] L_n = \dfrac{K^2_{2.o}}{4\pi^2 L_2} \times \dfrac{f^2_{\infty 2}}{f^2_{\infty 2} - f^2_{m.o}} \times \dfrac{f^2_{\infty 1} - f^2_{m.o}}{f^2_{\infty 1} f^2_{m.o}}. \end{array}\right\} \quad (8)$$

The evaluation of the coefficients for the trial design requires that numerical values be assigned to $K_{2\cdot o}$ and $L_2$. If the filter is required to operate between terminal apparatus or lines of fixed resistance the value of $K_{2\cdot o}$ may be made equal to the resistance of the terminal apparatus. From equation 7 it is evident that $K_{2\cdot o}$ is a non-reactive resistance, this being in accord with the well known fact that the mid-shunt and mid-series iterative impedances of a wave filter are non-reactive within the pass band frequency range. The inductance $L_2$ may be aribtrarily chosen.

Up to this point what has been accomplished is that certain necessary relationships between the coefficients have been found enabling a trial design to be worked out in which these relationships are satisfied. The relationships however are not sufficient to place the transmission band between its proper limits and this may now be done by a method of successive approximations.

The band limiting frequencies of the trial design may most easily be found by computing, for several frequencies extending through and beyond the limits of the desired transmission band, the series and shunt reactances of the filter section, and determining by a graphic plot of the characteristics the frequencies at which these reactances are in the ratio of one to four and of opposite sign.

In general it will be found that the frequencies so determined do not coincide with the desired band limits, and further trials must be made, the arbitrarily assumed quantities being varied in a systematic manner until the band limits are placed at the desired frequencies with a satisfactory degree of precision.

The rules to be observed in changing the basic coefficients of the design for successive trials are comparatively simple and depend principally upon certain general properties of the impedance characteristics. Consider, for example, the impedance characteristics shown in Fig. 6. Each curve exhibits a number of resonance and anti-resonance points which follow each other in an alternating sequence as the frequency increases. If the resonance and anti-resonance frequencies alone are fixed an infinite number of combinations of reactive elements may be devised to be resonant, and anti-resonant, respectively, at the same frequencies, the only condition being that the inductance-capacity products determining these frequencies be the same in all cases.

The impedances of the various combinations will be equal only at the resonance and anti-resonance frequencies and will be different at all other frequencies, but the impedance-frequency characteristics will all be of the same general type. The most noticeable differences are the slopes of the characteristics as they pass through zero impedance, and as they approach infinite impedance. Those combinations in which the inductances are relatively small and the capacities, in consequence, relatively large have impedance characteristics which have a small slope at resonance frequencies but which become very steep at points close to the anti-resonance frequencies. Such circuits are weakly discriminating at resonance. On the other hand combinations having large inductances and small capacities exhibit the opposite type of discrimination, the selectivity, as measured by the slope of the characteristic, being relatively great at resonance frequencies and the selectivity at anti-resonance frequencies being decreased.

The term stiffness has been used to describe the property of a network that shows in the slope of its impedance characteristic, those networks in which the ratio of inductance to capacity is large being designated circuits of great stiffness.

It will appear from an examination of Figure 28 that the positions of the band limits may be controlled by changing the stiffness of one or other of the filter branches. For example, by reducing the stiffness of the series impedance the band may be broadened, or, again, the same result may be achieved by increasing the stiffness of the shunt circuit.

If the graphic solution of the trial design shows that the transmission band is too narrow a second trial design may be computed using a stiffer shunt circuit, that is, assuming a larger value of the inductance $L_2$. The recomputation of the shunt impedance is a very simple matter, it being necessary only to increase the resultant reactances obtained by the first computation in proportion to the new value of the inductance.

It may be found that these steps do not suffice to place both band limits simultaneously in their proper places. This indicates that the arbitrarily assumed value of the confluence frequency $f_{m \cdot o}$ is not correct. In this case the adjustment of the shunt impedance should be continued until the proper band width is obtained. It will then be found that the band should be shifted bodily up or down in the frequency range, usually by a relatively small amount, the amount of the required shift indicating approximately the error in the choice of the confluence frequency of $f_{m \cdot o}$.

The design may now be recomputed from the beginning using the new values of $L_2$ and of the confluence frequency $f_m$, and, if upon checking the positions of the band limits errors still exist, the procedures outlined above may be repeated until a sufficient degree of accuracy is obtained.

It will seldom, however, be necessary to repeat the process more than once since it is generally true that the frequency of confluence $f_m$ is fairly close to the centre of the band and the correction to be applied after the first computation is usually found to be small.

In certain of the simpler forms of filter sections, for example those of Figures 19, 20, 21, 22 and 25, the examination of the series and shunt branch impedance characteristics will show that one of the band limits occurs at a frequency of resonance or of anti-resonance of one of the branches. This results in a simplification of the design procedure. An arbitrary design of one branch impedance may be computed, the sole condition being imposed that the resonance frequencies occur at the proper points dictated by the general requirements. The design of the second branch may then be arrived at by successive approximations involving the graphic plotting of the two impedance characteristics as already described. The result of these two steps will be a design in which the band limits and the frequencies of infinite attenuation are correctly placed but in which the iterative impedance may have any value. There remains, therefore, the step of bringing the iterative impedance to the proper value.

Figure 29:
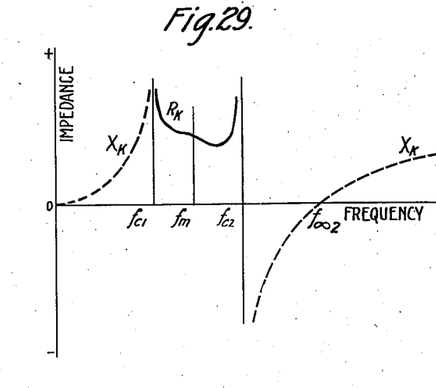

In the articles by Campbell and by Zobel hereinbefore mentioned it is pointed out that the mid-section iterative impedances are resistive throughout the transmission band and are variable with frequency. An example of the variation of the iterative impedance with frequency is shown in Fig. 29, the impedances plotted being the mid-shunt impedance of the section illustrated in Fig. 23. Between the band limits the impedance is resistive and is proportional to the ordinates of the curve $R_k$; outside the band limits the impedance is reactive, the reactances being proportional to the ordinates of the dotted curves $X_k$.

In designing a filter to operate between fixed resistances it is evident that the filter impedance and the terminating impedances cannot be matched at all frequencies and the best that can be done is to proportion the filter so that an approximate matching is obtained over the widest range of frequencies.

In the example, the design of which was discussed in detail the impedance at the frequency of confluence $f_m$ was taken as equal to the terminating impedance. This, in general, leads to satisfactory results as the impedance varies least rapidly in the neighborhood of that frequency.

In the case of the other simpler types the completion of the design after the important frequencies have been established may be accomplished as follows:

The impedance characteristic within the transmission band may be determined by computing a number of points, using equation (6) if the filter is mid-shunt terminated, and the following equation involving the same quantities, if the filter is mid-series terminated.

$$K_1 = \sqrt{Z_1 Z_2} \sqrt{1 + \frac{1}{4} \frac{Z_1}{Z_2}} \quad (9)$$

$K_1$ being the mid-series iterative impedance.

A comparison of the characteristic, so determined, with the values of the terminating impedance will indicate whether a good matching has been obtained by the first choice of coefficients, and, if not, will indicate in what ratio the filter impedances should be changed to obtain a good matching. If, then, all inductances are changed in accordance with the ratio so determined and all capacities changed in the inverse ratio, the iterative impedance at all frequencies will also be changed in the same proportion and the most desirable impedance matching will result.

It should be noted that since the inductances and the capacities are changed in inverse ratios their products will remain constant and there will therefore be no change in the band limiting frequencies.

Although this method of design requires a rather lengthy description the labor involved in carrying it out in practice is not great and it has the advantage, besides that of universal application, that the various characteristics are kept clearly before the mind throughout the whole process.

Figure 21:
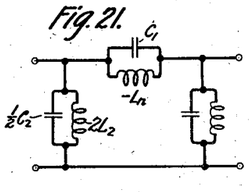
Figure 22:
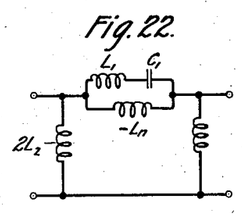
Figure 31:
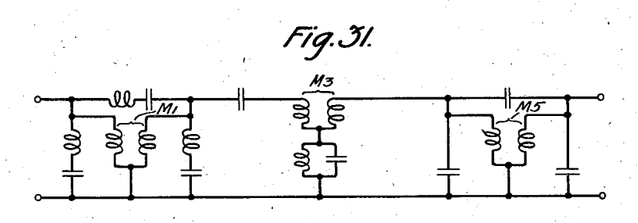
Figs. 31 and 32 illustrate a composite filter in which are included several of the sections shown in Figs. 19 to 27.
Figure 32:
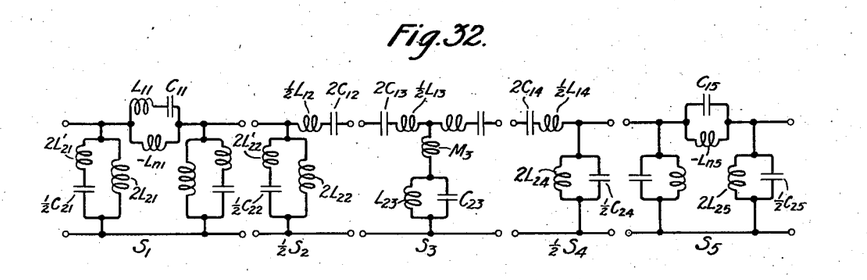

The filter sections illustrated in Figures 19 to 27 inclusive may be combined with each other or with other types of filter sections to form composite filters, the overall attenuations of which are the sums of the attenuations of the individual sections. One example of a composite filter in which sections of the types shown in Figs. 21, 23 and 26 are included is shown in Fig. 31, the details of the composition being shown in Fig. 32. In Fig. 31 the schematic showing of the section is like that of Figs. 4 and 5 and indicates in accordance with the more familiar conventions the actual elements of the filter. In Fig. 32 the schematic showing of Figs. 4$^a$ and 5$^a$ is used in order that the composition of the filter may be more clearly related to the foregoing description. The filter comprises three full sections designated $S_1$, $S_3$, and $S_5$, and two half sections designated $\frac{1}{2} S_2$ and $\frac{1}{2} S_4$. The full sections $S_1$, $S_3$ and $S_5$, are those of Figs. 23, 26, and 21, respectively, $S_1$ and $S_5$ being mid-shunt types and $S_3$ a mid-series type. The half sections afford convenient means for connecting between the mid-shunt and the mid-series types. The various inductances and capacities are designated in the same way as are the similar quantities in Figs. 19 to 27 but additional subscripts are used to denote the number of the section.

The most important requirement that has to be met in the design of composite filters is that there be no reflection losses at the junctions of the various sections. To secure this result it is necessary that each pair of sections should present to each other equal impedances at all frequencies and this will be the case if at each junction point the iterative impedances of the two sections joined together are the same. To be more exact, this will be the case in an infinitely extended filter, for, in a finite filter the effects of the terminating impedances cause the actual impedances to the right and left of any junction point to differ from the iterative impedances of the sections joined. The total effect due to the terminating impedances, however, may be separately determined from their values in relation to the iterative impedances of the end sections and so may be ignored in the consideration of the internal junctions.

The following general theorem is of great importance in connection with the design of composite filters. "If the two branches to be joined together have the same configuration of elements, then it is always possible to proportion the sections joined so that their iterative impedances are the same at all frequencies, provided the band limiting frequencies of the sections joined are the same."

No general proof of this theorem has been established but its correctness in connection with a large number of important cases has been mathematically demonstrated by O. J. Zobel in the reference hereinbefore cited, and further, in the computation of a great number and variety of filter designs the applicants have found no instance in which the theorem does not hold.

In Fig. 32 it will be observed that the shunt branches of sections $S_1$ and $\frac{1}{2} S_2$ have like configurations of elements, so also the series branches of sections $\frac{1}{2} S_2$ and $S_{31}$ and so on throughout the filter.

The various sections must, of course, be designed to have the same transmission band limits. This follows not only from general considerations but from the fact that the mid-section iterative impedances are resistive within the band and reactive without, and consequently could not match at all frequencies unless the band limits are the same throughout. Where the junction occurs between mid-shunt sections the shunt branches must be resonant at the same frequencies, because the mid-shunt iterative impedance is obviously zero when the shunt impedance is resonant. For an analogous reason two series branches joined together must be anti-resonant at the same frequencies.

In the filter sections of the present invention the similarity of the shunt or series branches to like branches of other sections is made evident when the equivalent or structures are determined as has been done in connection with Fig. 32.

The procedure in designing a composite filter is as follows. The types and number of sections to be used are chosen from general considerations of the total attenuation to be obtained and of the requirement that the branches to be joined together must have the same configuration of elements.

Constants for each section are determined by the methods hereinbefore described which suffice to place the band limits at the proper frequencies and the frequencies of infinite attenuation at desirable points, no particular regard being had for the iterative impedance.

The iterative impedance of one of the end sections for example $S_1$ should then be adjusted by modifying the inductance and the capacities in inverse ratios as has also been described, until the most desirable matching with the terminating impedance has been obtained.

To bring the other sections to equality with the end section $S_1$ it is necessary to determine their iterative impedances at only one frequency, the branches joined having the same configurations and the cut-off frequencies being equal it follows from the theorem stated above that the iterative impedance characteristics at each junction are similar in form and need to be adjusted to equality at only one frequency.

The impedances of the sections starting from the adjusted end section may be adjusted in succession, the single frequency at which the computations are made being chosen preferably close to the centre of the transmission band.

What is claimed is:

1. A wave filter section comprising a plurality of circuit branches disposed in series and shunt relationships to the direction of wave propagation, reactive impedance elements included in said branches, the impedances of which cooperate to enable the filter section to pass freely a band of wave frequencies the limits of which are both above zero frequency, inductive coils in two similarly disposed circuit branches which are separated by an oppositely disposed branch, and mutual inductance between said coils, said mutual inductance being positive with respect to the series connection of said coils and determining at least in part the wave transmission characteristics of the filter section.

2. A wave filter section comprising a plurality of circuit branches disposed in series and shunt relationships to the direction of wave propagation, reactive impedance elements included in said branches, the impedances of which cooperate to enable the filter section to pass freely a band of wave frequencies the limits of which are both above zero frequency, and a pair of coupled inductive windings included in two similarly disposed circuit branches which are separated by an oppositely disposed branch, the sense of the coupling being such that the mutual inductance increases the total inductance of a path through the two windings in series, and the mutual inductance of said windings determining at least in part the wave transmission characteristics of the filter section.

3. A wave filter section comprising a plurality of circuit branches disposed in series and shunt relationships to the direction of wave propagation, reactive elements included in said branches, the impedances of said elements cooperating to permit the filter to pass freely a band of frequencies the limits of which are both above zero frequency, and a pair of coupled inductances included in two of said shunt branches which are separated by a series branch, the sense of the coupling being such that the mutual inductance increases the total inductance of a path through the two windings in series.

4. A wave filter section comprising two shunt impedance paths and at least one series impedance path connected therebetween, an inductance coil included in each of said shunt paths as a parallel branch thereof, and mutual inductance between said coils the sense of the mutual inductance coupling being such that the total inductance of the series connection of the coils is increased by the mutual inductance, said mutual inductance and the impedances of said series and said shunt paths cooperating to permit the filter section to pass freely a band of wave frequencies the limits of which are both above zero frequency and to attenuate all other frequencies.

5. A wave filter section comprising a plurality of circuit branches alternately disposed in series and shunt relationship to the direction of wave propagation, mutual inductance between two similarly disposed branches the sense of the mutual inductance being such that the filter section is equivalent in respect to its impedance and wave propagation characteristics to a simple network of independent series and shunt impedances including a negative inductance element, and said mutual inductance cooperating with the impedances of said branches to permit the filter section to pass freely a band of wave frequencies the limits of which are both above zero frequency.

6. A wave filter section adapted to pass a band of wave frequencies the limits of which are both above zero frequency, comprising in combination with three impedance branches which are disposed alternately in series and shunt with respect to the direction of wave propagation, a pair of coupled inductances, said inductances being included in two similarly disposed branches and being coupled in such sense that a negative inductance is effectively introduced into an intermediate oppositely disposed branch.

7. A wave filter section, in accordance with claim 6, characterized in this that the said negative inductance is adapted to resonate with the circuit elements of the branch wherein it is effectively introduced at a frequency outside the transmission band limits, whereby a substantially infinite degree of attenuation is produced at said frequency.

8. A wave filter comprising a plurality of sections of different types at least one of said sections being of the type described in claim 5, the sections of said wave filter being terminated at their junction points in impedance branches having like configurations of impedance elements and being so proportioned that no reflection losses occur at the junctions of successive filter sections.

9. A wave filter section comprising a series impedance, two shunt impedances, said series and shunt impedances being arranged in a delta network formation, and a pair of coupled inductances connected in series and in mutually aiding inductive relation between the terminals of said series impedance, the junction point of said inductances being connected to the junction point of said shunt impedances, and said inductances being proportioned to cooperate with said series and shunt impedances to permit the filter section to pass freely a single band of wave frequencies, the limits of which are both greater than zero frequency.

In witness whereof, we hereunto subscribe our names this 28th day of January A. D., 1925.

KENNETH S. JOHNSON.
TIMOTHY E. SHEA.